(12) United States Patent
Zhang et al.

(10) Patent No.: US 11,951,725 B2
(45) Date of Patent: Apr. 9, 2024

(54) METHOD OF MANUFACTURING BONDING STRUCTURAL TEST BLOCK WITH DEFECTS

(71) Applicant: AECC Commercial Aircraft Engine Co., Ltd., Shanghai (CN)

(72) Inventors: Ting Zhang, Shanghai (CN); Aihua Huang, Shanghai (CN); Xiangqian Li, Shanghai (CN)

(73) Assignee: AECC Commercial Aircraft Engine Co., Ltd., Shanghai (CN)

( * ) Notice: Subject to any disclaimer, the term of this patent is extended or adjusted under 35 U.S.C. 154(b) by 207 days.

(21) Appl. No.: 17/615,923

(22) PCT Filed: Dec. 18, 2020

(86) PCT No.: PCT/CN2020/137425
§ 371 (c)(1),
(2) Date: Dec. 2, 2021

(87) PCT Pub. No.: WO2021/244008
PCT Pub. Date: Dec. 9, 2021

(65) Prior Publication Data
US 2022/0219442 A1 Jul. 14, 2022

(30) Foreign Application Priority Data
Jun. 5, 2020 (CN) .......................... 202010507968.9

(51) Int. Cl.
*B32B 37/12* (2006.01)
*G01N 29/30* (2006.01)
(52) U.S. Cl.
CPC ...... *B32B 37/12* (2013.01); *B32B 2037/1253* (2013.01); *G01N 29/30* (2013.01)

(58) Field of Classification Search
CPC .... G01N 29/30; B32B 37/12; B32B 37/1207; B32B 37/1253; B32B 37/1284; B32B 37/0076; B32B 37/0084
See application file for complete search history.

(56) References Cited

U.S. PATENT DOCUMENTS

| | | | |
|---|---|---|---|
| 6,018,999 | A | 2/2000 | Woodmansee et al. |
| 8,342,017 | B1 | 1/2013 | Bossi et al. |

(Continued)

FOREIGN PATENT DOCUMENTS

| | | |
|---|---|---|
| CN | 102426200 A | 4/2012 |
| CN | 105004793 A | 10/2015 |

(Continued)

OTHER PUBLICATIONS

Han, Chang Dae. © 2007. Rheology and Processing of Polymeric Materials, vol. 1—Polymer Rheology—Chapter 14. Oxford University Press. (Year: 2007).*

(Continued)

*Primary Examiner* — Carson Gross
(74) *Attorney, Agent, or Firm* — STERNE, KESSLER, GOLDSTEIN & FOX P.L.L.C.

(57) ABSTRACT

The present disclosure provides a method of manufacturing a bonding structural test block with defects. The method of manufacturing the bonding structural test block with defects includes: providing a first plate and a second plate; applying an adhesive on an upper surface of the first plate to form an adhesive layer; heating and curing at least partial region of the adhesive layer for the first time; placing the second plate on the adhesive layer; and heating and curing the adhesive layer for the second time to form a boding structural test block. According to the present disclosure, the at least partial region of the adhesive layer is heated and cured for the first time and chemical reaction occurs, so that the at least partial region forms a defect, and controllable manufacturing of the (Continued)

defect is realized. The test block with the defect is subjected to mechanical detection to simulate the actual defective product. Furthermore, according to the method provided by the present disclosure, weak bond defect and kiss-bonds defect with different bonding strength are simulated by controlling the percentage of the at least partial region in the entire region of the adhesive layer.

16 Claims, 4 Drawing Sheets

(56) References Cited

U.S. PATENT DOCUMENTS

| | | | |
|---|---|---|---|
| 8,796,145 B2 | 8/2014 | Nishi et al. | |
| 9,488,620 B2 | 11/2016 | Adams et al. | |
| 10,488,369 B2* | 11/2019 | Juarez | G01N 29/30 |
| 2007/0028661 A1* | 2/2007 | Girshovich | G01N 29/30 |
| | | | 73/1.01 |
| 2015/0198520 A1 | 7/2015 | Slocum et al. | |
| 2016/0059518 A1 | 3/2016 | Fukunaga et al. | |
| 2023/0157799 A1* | 5/2023 | Earthman | A61C 19/04 |
| | | | 433/72 |

FOREIGN PATENT DOCUMENTS

| | | |
|---|---|---|
| CN | 106093211 A | 11/2016 |
| CN | 108318579 A | 7/2018 |
| CN | 109406630 A | 3/2019 |
| CN | 209745889 U | 12/2019 |
| CN | 111208195 A | 5/2020 |
| EP | 2769834 A1 | 8/2014 |
| WO | 2007097727 A1 | 8/2007 |

OTHER PUBLICATIONS

Extended European Search Report of the EPO for EP20936073, mailed on Feb. 15, 2024, 7 pages.

* cited by examiner

METHOD OF MANUFACTURING BONDING STRUCTURAL TEST BLOCK WITH DEFECTS

RELATED APPLICATION

The application is based upon and claims priority to Chinese Patent Application No. 202010507968.9, filed on Jun. 5, 2020, the entire contents of all of which are incorporated herein by reference.

TECHNICAL FIELD

The present disclosure relates to the field of nondestructive detection, in particular to a method of manufacturing a bonding structural test block with defects.

BACKGROUND

With the rapid development of civil aviation, it is required that the aircraft structural materials must develop in the direction of low density, high strength, high toughness, high temperature resistance and corrosion resistance. In the traditional civil aviation structure, it is necessary to connect parts by a large number of rivets to form some parts. Small aircraft usually includes tens of thousands of rivets, which inevitably makes the aircraft weight heavier. The cementing structure has been widely applied to the civil aircraft structure instead of riveting, but it is inevitable to introduce various defects in the manufacturing process of the cementing structure, including crack, gap/hole, debonding, weak bond, etc.

Kiss-bonds is a defect type in the cementing structure and refers to a defect that two surfaces in the cementing structure are in close contact, that is, the two surfaces are not bonded, and the kiss-bonds will lead to the reduction of the structural load capacity. In addition, the defect similar to that of the kiss-bonds is weak bond, that is, two surfaces are bonded incompletely. Due to some structural continuity, the weak bond may be more difficult to evaluate. The kiss-bonds and weak bond defects may occur in monolithic, sandwich, bonded or repaired composite materials, which may be introduced in the manufacturing process and may also be caused by insufficient damage or repair. The loss of the structural strength and the potential growth of defects (that is, growing from weak bond/kiss-bonds to debonding) under the loading condition during use make the detection and evaluation of the defect type particularly important.

In order to test the defects, a comparison test block with defects must be created first. However, it is difficult to manufacture the test block, so it is very important to controllably manufacture the test blocks with kiss-bonds and weak bond and detect the internal defects.

SUMMARY

The present disclosure provides a method of manufacturing a bonding structural test block with defects, including the following steps:
  providing a first plate and a second plate;
  applying an adhesive on an upper surface of the first plate to form an adhesive layer;
  heating and curing at least partial region of the adhesive layer for the first time;
  placing the second plate on the adhesive layer: and
  heating and curing the adhesive layer for the second time to form a bonding structural test block.

In some embodiments, the at least partial region includes a plurality of preset region blocks which are distributed on the adhesive layer at intervals: and the step of heating and curing the at least partial region of the adhesive layer for the first time includes: alone heating and curing the plurality of preset region blocks of the adhesive layer.

In some embodiments, the method further includes: determining positions and area of the plurality of preset region blocks according to preset positions and preset area of defects before the step of alone heating and curing the plurality of preset region blocks of the adhesive layer.

In some embodiments, the step of alone heating and curing the plurality of preset region blocks of the adhesive layer is performed by a pre-curing equipment, the pre-curing equipment includes a heating plate and a plurality of heating columns movably arranged on heating plate, and the positions of the plurality of heating columns are adjusted to correspond to the plurality of preset region blocks on the adhesive layer.

In some embodiments, the step of applying the adhesive on the upper surface of the first plate to form the adhesive layer includes: applying an adhesive on a region close to an end part of the upper surface of the first plate to overlap the second plate on an end of the first plate.

In some embodiments, the method further includes: performing temperature rise rheological property test on the adhesive and obtaining a rheological curve of the adhesive, and selecting the temperature of the heating and curing for the first time and the temperature of the heating and curing for the second time according to the rheological curve.

In some embodiments, the step of applying the adhesive on the upper surface of the first plate to form the adhesive layer includes: applying the adhesive on the entire region of the upper surface of the first plate to make the adhesive cover the upper surface of the first plate. At least partial region includes the entire region of the adhesive layer. The manufacturing method further includes: before heating and curing the entire region of the adhesive layer for the first time, applying and pasting the second plate on the adhesive layer and then heating and curing the adhesive layer for the first time; after the entire region of the adhesive layer is heated and cured for the first time, separating the first plate and the second plate from the middle of the adhesive layer, superposing the separated first plate and second plate, and heating and curing the adhesive layer for the second time.

In some embodiments, both the heating and curing the adhesive layer for the first time and the second time is performed by an autoclave; and the temperature of the heating and curing the adhesive layer for the first time and for the second time is same and the heating time of the heating and curing the adhesive layer (3) for the first time and for the second time is different.

In some embodiments, the method further includes: creating a crack on the adhesive layer.

In some embodiments, the adhesive is an adhesive film, and the adhesive film is paved on the upper surface of the first plate to form the adhesive layer.

In some embodiments, the first plate and the second plate which are made of composite materials are provided, and the composite material of the first plate and the composite material of the second plate are the same or different.

in some embodiments, after the test block is obtained, the test block is subjected to ultrasonic scanning to determine defect information.

Based on the technical solution provided by the present disclosure, the method of manufacturing the bonding structural test block with defects includes: providing a first plate and a second plate; applying an adhesive on an upper surface of the first plate to form an adhesive layer; heating and curing at least partial region of the adhesive layer for the first time; placing the second plate on the adhesive layer; and heating and curing the adhesive layer for the second time to form a cementing structure test block. According to the present disclosure, the at least partial region of the adhesive layer is heated and cured for the first time and chemical reaction occurs, so that the at least partial region forms a defect, and controllable manufacturing of the defect is realized. The test block with defects is subjected to mechanical detection to simulate the actual defective product. Furthermore, according to the method provided by the present disclosure, weak bond defect and kiss-bonds defect with different bonding strength are simulated by controlling the percentage of the at least partial region in the entire region of the adhesive layer.

Other features and advantages of the present disclosure will become apparent by the detailed destinations for exemplary embodiments of the present disclosure with reference to the following accompany drawings.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following described accompanying drawings show some embodiments recorded in the present disclosure, and a person of ordinary skill in the art may still derive other drawings from these accompanying drawings.

FIG. 4 to FIG. 7 are schematic diagrams of process steps of a test block with weak bond defect manufactured by an embodiment of the present disclosure, wherein FIG. 8 to FIG. 10 are schematic diagrams of process steps of a test block with kiss-bonds defect manufactured by an embodiment of the present disclosure, wherein

DETAILED DESCRIPTION

To make the objectives, technical solutions, and advantages of the present disclosure clearer, a manufacturing method of a cementing structure defect test block provided by the present disclosure is further described below in detail through the embodiments and with reference to the accompanying drawings. It should be understood that the specific embodiments described herein are only for explaining the present disclosure, rather than for limiting the present disclosure.

Figure 1:
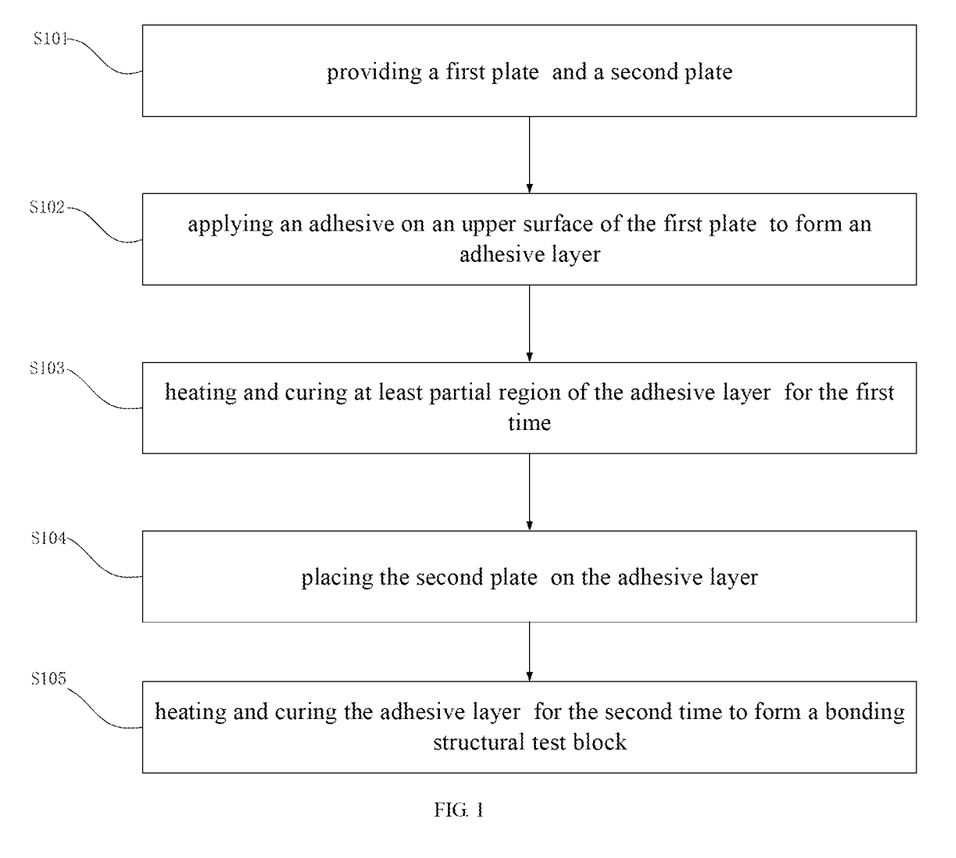
FIG. 1 is a schematic diagram of steps of a method of manufacturing a bonding structural test block with defects according to an embodiment of the present disclosure.

As shown in FIG. 1, a method of manufacturing a bonding structural test block with defects according to an embodiment of the present disclosure includes the following steps:

Step 101: a first plate 1 and a second plate 2 are provided;

Step 102: an adhesive is applied on an upper surface of the first plate 1 to form an adhesive layer 3;

Step 103: at least partial region of the adhesive layer 3 is heated and cured for the first time;

Step 104: the second plate 2 is placed on the adhesive layer 3; and

Step 105: the adhesive layer 3 is heated and cured for the second time to form a bonding structural test block.

According to the embodiment of the present disclosure, the at least partial region of the adhesive layer 3 is heated and cured for the first time and chemical reaction occurs, so that the at least partial region forms a defect, and controllable manufacturing of the defect is realized. The test block with the defect is subjected to mechanical detection to simulate the actual defective product. Furthermore, according to the manufacturing method provided by the present disclosure, weak bond defect with different bonding strength is simulated by controlling the percentage of the at least partial region in the entire region of the adhesive layer.

It should be noted herein that other steps may be performed among the above steps.

Figure 6:
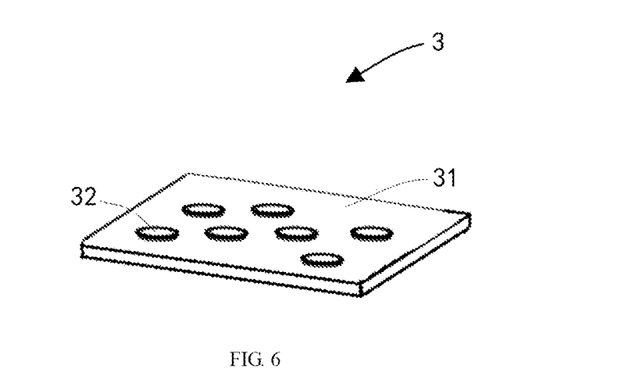
FIG. 6 shows an enlarged structure diagram of the adhesive layer in FIG. 5.

Referring to FIG. 6, FIG. 6 is a structure diagram of the adhesive layer 3 after the first heating and curing, wherein 31 is a non-curing region, and 32 is a curing region. Before the cementing structure defect test block is manufactured, preset positions and preset area of defects of a test block with defects to be manufactured are determined first. The method of this embodiment further includes: positions and area of the plurality of preset region blocks are determined according to the preset positions and preset area of the defects before the step of alone heating the plurality of preset region blocks of the adhesive layer. that is, a preset region block is a curing region.

Figure 4:
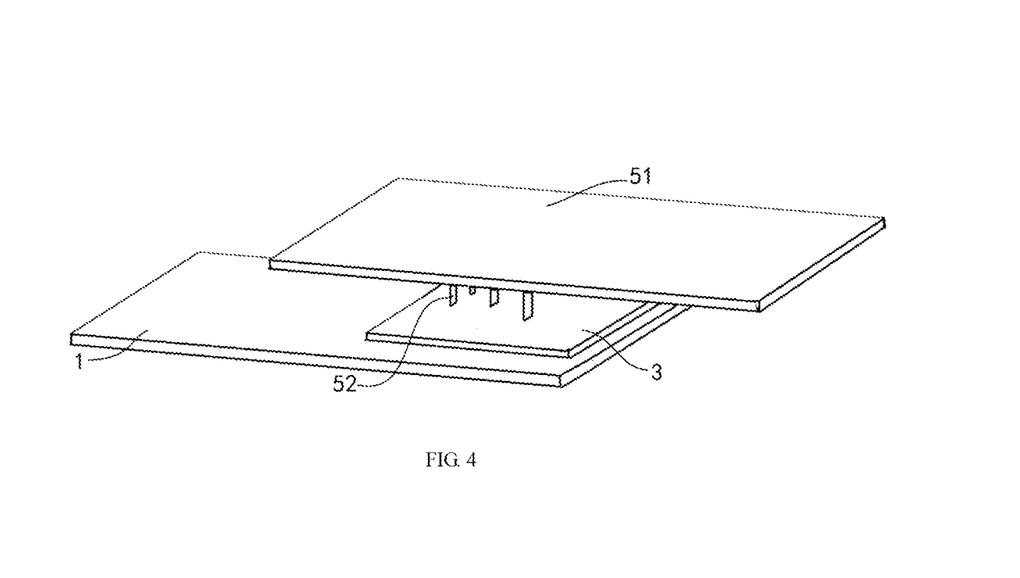
FIG. 4 shows performing first heating and curing on the adhesive layer by the pre-curing equipment.

In one embodiment, the embodiment of the present disclosure provides a manufacturing method of a weak bond defect test block. As shown in FIG. 4, the at least partial region of the embodiment includes a plurality of preset region blocks which are distributed on the adhesive layer 3 at intervals; and the step of heating and curing the at least partial region of the adhesive layer 3 for the first time includes: the plurality of preset region blocks of the adhesive layer 3 are independently heated.

Figure 3:
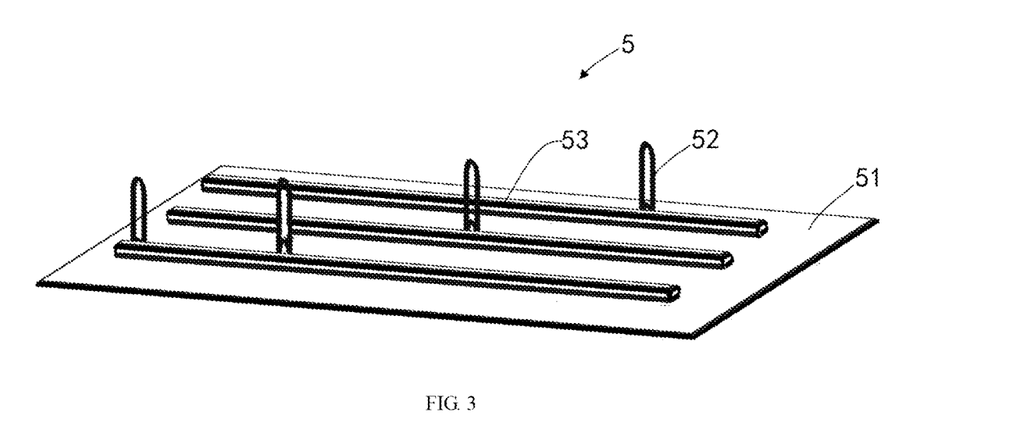
FIG. 3 is a structural schematic diagram of pre curing equipment used by an embodiment of the present disclosure.

Specifically, in this embodiment, the plurality of preset regions of the adhesive layer 3 are independently heated by pre-curing equipment 5 shown in FIG. 3. The pre-curing equipment 5 includes a heating plate 51 and a plurality of heating columns 52 which are movably arranged on the heating plate 51, and the positions of the plurality of heating columns 52 are adjusted to correspond to the plurality of preset regions on the adhesive layer 3.

In order to be suitable for manufacturing of test blocks with different defect sizes and positions, the pre-curing equipment 5 of this embodiment further includes a positioning groove 53, the heating column 52 is arranged in the positioning groove 53, and the position of the positioning groove 53 is adjusted to change the position of each of the heating columns 52.

As shown in FIG. 4, the plurality of heating columns 52 abut against the adhesive layer 3 to heat and cure the plurality of preset regions of the adhesive layer 3 for the first time, and the adhesive layer 3 after the first heating and curing is shown in FIG. 6.

Figure 7:
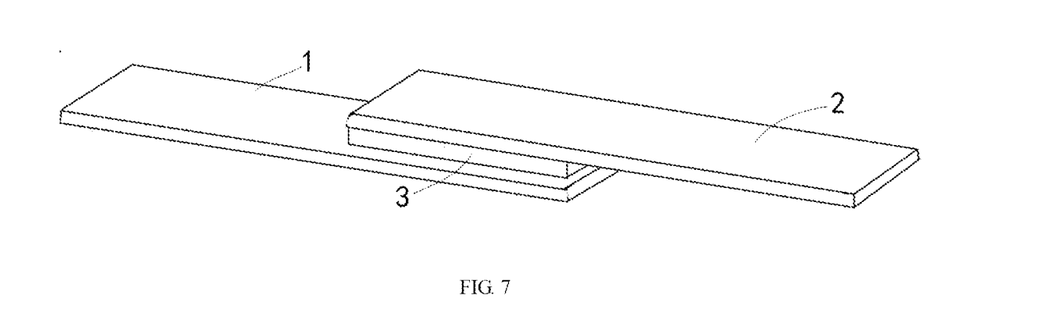
FIG. 7 shows a structural schematic diagram of a test block with defects formed after the second heating and curing.

As shown in FIG. 7, the step of applying the adhesive on the upper surface of the first plate 1 to form the adhesive layer 3 includes: the adhesive layer 3 is formed on a region, close to the end part, of the upper surface of the first plate 1, and the second plate 2 overlaps the first plate 1.

Figure 2:
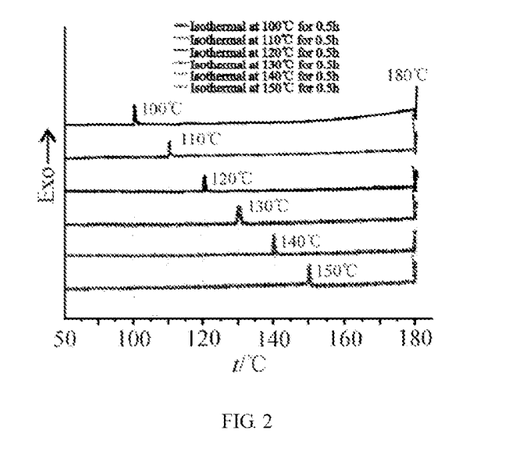
FIG. 2 is a rheological curve of an adhesive film according to an embodiment of the present disclosure.

As shown in FIG. 2. the method of this embodiment further includes: the adhesive is subjected to temperature rise rheological property test and a rheological curve of the adhesive is obtained, and the temperature of the first heating and curing and the temperature of second heating and curing are selected according to the rheological curve.

Specifically, the temperature of the first heating and curing is less than the temperature of the second heating and curing.

The method of manufacturing the test block with weak bond defect is described below in detail with reference to the specific embodiments.

Firstly, materials of the first plate 1, the second plate 2 and the adhesive film are selected. In this embodiment, the composite material of the first plate 1 and the composite material of the second plate 2 are the same and are CYCOM X850, and the material of the adhesive film is PL7000.

The adhesive film is subjected to temperature rise rheological property test by a rheometer. During the test, a parallel plate clamp is used, the adhesive film is made into a wafer with a diameter of 25 mm at room temperature, three adhesive films are superposed and compacted to prepare a test sample, and the rheological curve of the adhesive films is obtained, as shown in FIG. 2.

as shown in FIG. 4, the first plate 1 is applied and pasted, and the adhesive film is applied and pasted on the surface of the first plate 1.

The heating column 51 in the pre-curing equipment 5 is adjusted according to the preset position and preset area of the designed weak bond defect and is connected to the upper surface of the adhesive film. Specifically, in this embodiment, fifty needle-like heating columns are arranged, and each of the heating columns 51 is round with a diameter of 0.2 mm.

The adhesive film is partially pre-cured by the pre-curing equipment 5, the heating rate of the adhesive film in contact with the heating columns 51 on the adhesive film is 2-3° C./min, the curing temperature is 100° C.±10° C., and the time is 30 min.

Figure 5:
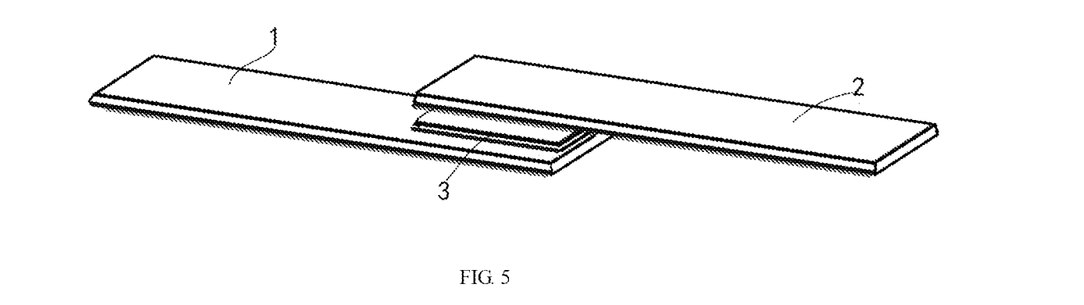
FIG. 5 shows overlapping the second plate on the first plate.

As shown in FIG. 5, the pre-curing equipment 5 is removed, and pavement of the second plate 2 on the adhesive film is completed to obtain a single-overlapping cementing structure.

Peelable cloth, an isolating film, ventilated felt and a pressure-equalizing plate auxiliary material are sequentially placed on the applied single-overlapping cementing structure, the test block is packaged by a vacuum bag and is put into an autoclave for curing, wherein the curing temperature is 180° C., heat preservation is conducted for 120 min, and the curing pressure is 0.7 Mpa.

Demolding is performed to obtain the single-overlapping test block with partial weak bond as shown in FIG. 7.

The test block is subjected to ultrasonic scanning to obtain a defect signal. Machining is performed to obtain a single-overlapping test block meeting the standard.

The single-overlapping test block is subjected to mechanical property test.

Figure 8:
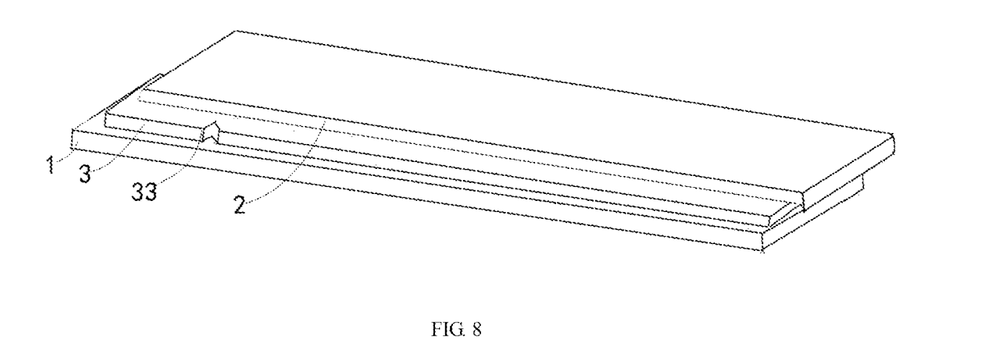
FIG. 8 shows superposing the first plate, the adhesive layer and the second plate.

In another embodiment, the present disclosure provides a method of manufacturing a test block with kiss-bonds defect. As shown in FIG. 8, the adhesive layer 3 covers the upper surface of the first plate 1. At least partial region includes the entire region of the adhesive layer 3. The manufacturing method further includes: before the entire region of the adhesive layer 3 is heated and cured for the first time, the second plate 2 is applied and pasted on the adhesive layer 3 and then the adhesive layer 3 is heated and cured for the first time; after the entire region of the adhesive layer 3 is heated and cured for the first time, as shown in FIG. 9, the first plate 1 and the second plate 2 are separated from the middle of the adhesive layer 3, the separated first cementing 1 and second plate 2 are superposed (FIG. 10 shows that the separated first plate 1 and second plate 2 are superposed), and the entire cementing structure is heated and cured to heat and cure the adhesive layer 3 for the second time.

Figure 9:
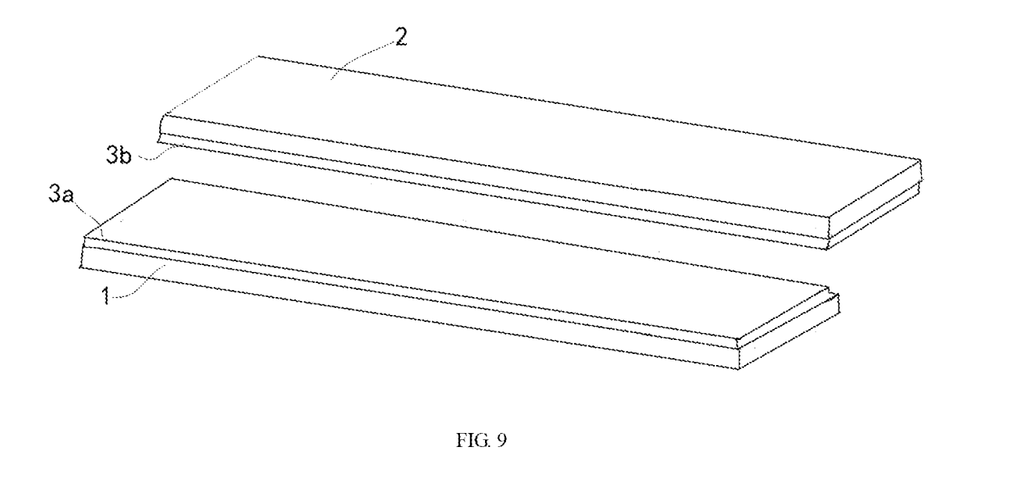
FIG. 9 shows separating the first plate and the second plate of an intermediate cementing structure subjected to the first heating and curing.
Figure 10:
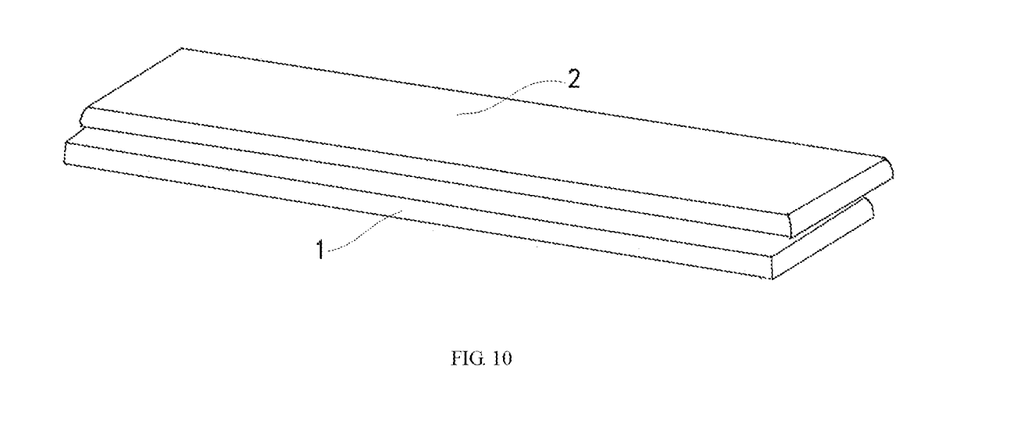
FIG. 10 shows a structural schematic diagram of a test block with defect formed after the second heating and curing.

As shown in FIG. 9, the first plate 1 and the second plate 2 are separated from the middle of the adhesive layer 3, and at this time, an adhesive layer split body 3a is arranged on the upper surface of the first plate 1 and an adhesive layer split body 3b is arranged on the lower surface of the second plate 2.

In this embodiment, both the first heating and curing and the second heating and curing adopt an autoclave for heating and curing; and the first heating and curing and the second heating and curing have the same temperature and different heating time.

In the above embodiments, a crack may be preset on the adhesive layer 3 according to the setting requirement of the defect.

In order to facilitate the formation of the adhesive layer 3, the adhesive of this embodiment is an adhesive film, and the adhesive film is applied on the upper surface of the first plate to form the adhesive layer 3.

The manufacturing method of this embodiment provides a first plate 1 and a second plate 2 which are made of composite materials, wherein the composite material of the first plate 1 and the composite material of the second plate 2 are the same or different.

After the test block is obtained, the test block is subjected to ultrasonic scanning to determine defect information.

The method of manufacturing the test block with kiss-bonds defect is described below in detail with reference to the specific embodiments.

The first plate 1, the second plate 2 and the adhesive film are prepared first. In this embodiment, the composite material of the first plate 1 and the composite material of the second plate 2 are the same and are CYCOM 970/PWC T300 3K ST (CCF), and the material of the adhesive film is PL7000.

as shown in FIG. 8, the crack 33 is preset on the adhesive film, the first plate 1, the adhesive film and the second plate 2 are sequentially applied to form an intermediate cementing structure, peelable cloth, an isolating film, ventilated felt and a pressure-equalizing plate auxiliary material are sequentially placed above the intermediate cementing structure, and the intermediate cementing structure is packaged by a vacuum bag and is put into the autoclave for the first heating and curing, wherein the curing temperature is 177° C.±10° C., heat preservation is performed for 120 min, and the curing pressure is 0.7 Mpa.

As shown in FIG. 9, the first plate 1 and the second plate 2 are separated by an external force, and the first plate 1 and the second plate 2 are separated from the middle of the adhesive layer 3.

as shown in FIG. 10, (FIG. 10 does not show the adhesive layer, but includes the adhesive layer), the separated first plate 1 and second plate 2 are superposed and are heated and cured for the second time, wherein the curing temperature is 177° C.±10° C., heat preservation is performed for 60 min, and the curing pressure is 0.7 Mpa; and demolding is performed to obtain the test block containing the precrack and the kiss-bonds defect.

It should be noted that when a component is referred to as being "fixed" to another component, the component may be directly arranged on another component or a central component may be present. When one component is considered as being "connected" to another component, the component may be directly connected to another component or a central component may be present at the same time. On the contrary, when the component is referred to as being "directly on" another component, there is no intermediate component. The terms "vertical", "horizontal", "left", and "right" and similar expressions used herein are for illustrative purposes only.

In the description of the present disclosure, terms "first" and "second" are merely for a descriptive purpose, but cannot be understood as indicating or implying relative importance.

Meanwhile, the terms such as "upper", "lower", "left", "right", "middle" and "one" quoted in this specification are only convenient for clear description and are not used to limit the implementable scope of the present disclosure. The change or adjustment of the relative relationship should be regarded as the implementable scope of the present disclosure without substantial change of the technical content.

The foregoing embodiments are merely illustrative of several embodiments of the present disclosure, and the description thereof is more specific and detailed, but should not be construed as limiting the patent scope of the present disclosure. It should be pointed out that several variations and improvements may be made by those of ordinary skill in the art without departing from the conception of the present disclosure, but such variations and improvements should fall within the protection scope of the present disclosure. Therefore, the protection scope of the patent of the present disclosure should be subject to the appended claims.

The invention claimed is:

1. A method of manufacturing a bonding structural test block with defects, comprising the following steps:
   providing a first plate (1) and a second plate (2);
   applying an adhesive on an upper surface of the first plate (1) to form an adhesive layer (3);
   heating and curing a plurality of preset region blocks (32) of the adhesive layer (3) for a first time, so that the plurality of preset region blocks (32) forms defects, wherein the plurality of preset region blocks (32) is distributed on the adhesive layer (3) at intervals;
   placing the second plate (2) on the adhesive layer (3); and
   heating and curing the adhesive layer (3) for a second time to form the bonding structural test block.

2. The method of manufacturing the bonding structural test block with defects according to claim 1, further comprising: determining positions and area of the plurality of the preset region blocks (32) according to preset positions and preset area of defects before the step of alone heating and curing the plurality of preset region blocks (32) of the adhesive layer (3).

3. The method of manufacturing the bonding structural test block with defects according to claim 1, the step of alone heating and curing the plurality of preset region blocks (32) of the adhesive layer (3) is performed by a pre-curing equipment (5), the pre-curing equipment (5) comprises a heating plate (51) and a plurality of heating columns (52) movably arranged on the heating plate (51), and the positions of the plurality of heating columns (52) are adjusted to correspond to the positions of the plurality of preset region blocks (32) on the adhesive layer (3).

4. The method of manufacturing the bonding structural test block with defects according to claim 1, wherein the step of applying the adhesive on the upper surface of the first plate (1) to form the adhesive layer comprises: applying the adhesive on a region close to an end part of the upper surface of the first plate (1) to overlap the second plate (2) on an end of the first plate (1).

5. The method of manufacturing the bonding structural test block with defects according to claim 1, further comprising: performing temperature rise rheological property test on the adhesive and obtaining a rheological curve of the adhesive, and selecting the temperature of the heating and curing for the first time and the temperature of the heating and curing for the second time according to the rheological curve.

6. The method of manufacturing the bonding structural test block with defects according to claim 1, further comprising: creating a crack (33) on the adhesive layer (3).

7. The method of manufacturing the bonding structural test block with defects according to claim 1, wherein the adhesive is an adhesive film, and the adhesive film is applied on the upper surface of the first plate (1) to form the adhesive layer (3).

8. The method of manufacturing the bonding structural test block with defects according to claim 1, wherein the first plate (1) and the second plate (2) which are made of composite materials are provided, and the composite material of the first plate (1) and the composite material of the second plate (2) are the same or different.

9. The method of manufacturing the bonding structural test block with defects according to claim 1, further comprising: after the test block with defects is obtained, the test block is subjected to ultrasonic scanning to determine defect information.

10. A method of manufacturing a bonding structural test block with defects, comprising the following steps:
    providing a first plate (1) and a second plate (2);
    applying an adhesive on an entire region of an upper surface of the first plate (1) to make an adhesive layer (3) covering the upper surface of the first plate (1);
    applying and pasting the second plate (2) on the adhesive layer (3);
    heating and curing the entire region of the adhesive layer (3) for a first time;
    after heating and curing the entire region of the adhesive layer (3) for the first time, separating the first plate (1) and the second plate (2) from the middle of the adhesive layer (3) and superposing the separated first plate (1) and second plate (2); and
    heating and curing the adhesive layer (3) for a second time to form the bonding structural test block with defects.

11. The method of manufacturing the bonding structural test block with defects according to claim 10, wherein both the heating and curing the adhesive layer (3) for the first time and the second time is performed by an autoclave; and the temperature of the heating and curing the adhesive layer (3) for the first time and for the second time is same and the heating time of the heating and curing the adhesive layer (3) for the first time and for the second time is different.

12. The method of manufacturing the bonding structural test block with defects according to claim 10, further comprising: creating a crack (33) on the adhesive layer (3).

13. The method of manufacturing the bonding structural test block with defects according to claim 10, wherein the adhesive is an adhesive film, and the adhesive film is applied on the upper surface of the first plate (1) to form the adhesive layer (3).

14. The method of manufacturing the bonding structural test block with defects according to claim 10, wherein the first plate (1) and the second plate (2) which are made of composite materials are provided, and the composite material of the first plate (1) and the composite material of the second plate (2) are the same or different.

15. The method of manufacturing the bonding structural test block with defects according to claim 10, further comprising: after the test block with defects is obtained, the test block is subjected to ultrasonic scanning to determine defect information.

16. The method of manufacturing the bonding structural test block with defects according to claim 10, further comprising: performing temperature rise rheological property test on the adhesive and obtaining a rheological curve of the adhesive, and selecting the temperature of the heating and curing for the first time and the temperature of the heating and curing for the second time according to the rheological curve.

\* \* \* \* \*